United States Patent
Lackner

[11] 3,782,825
[45] Jan. 1, 1974

[54] METHOD AND APPARATUS FOR CHECKING THE STABILITY OF A SETUP FOR MAKING REFLECTION TYPE HOLOGRAMS

[75] Inventor: Helmut G. Lackner, Salzberg, Austria

[73] Assignee: The United States of America as represented by the Administrator of the National Aeronautics and Space Administration, Washington, D.C.

[22] Filed: Aug. 18, 1972

[21] Appl. No.: 281,877

[52] U.S. Cl. ................... 356/106, 350/3.5, 73/71.3
[51] Int. Cl. ............................................... G01b 9/02
[58] Field of Search .............. 356/106–113; 350/3.5

[56] References Cited
UNITED STATES PATENTS

| | | | |
|---|---|---|---|
| 3,622,794 | 11/1971 | Pond | 356/106 |
| 3,630,592 | 12/1971 | Cooper, Jr. | 73/71.3 |
| 3,659,947 | 5/1972 | Neumann | 356/106 |

*Primary Examiner*—David Schonberg
*Assistant Examiner*—Conrad Clark
*Attorney*—L. D. Wofford, Jr. et al.

[57] ABSTRACT

A method and apparatus for checking the stability of a setup for recording reflection-type (white light) holograms. Two sets of interference fringes are simultaneously obtained, one giving information about coherence and stability of the setup alone and the other demonstrating coherence of the entire system, including the holographic recording plate. Thus special emphasis is given to the stability of the plate, any minute vibrations of which may severely degrade or completely destroy the recording.

10 Claims, 2 Drawing Figures

PATENTED JAN 1 1974 3,782,825

3,782,825

METHOD AND APPARATUS FOR CHECKING THE STABILITY OF A SETUP FOR MAKING REFLECTION TYPE HOLOGRAMS

BACKGROUND OF THE INVENTION

1. Field of the Invention

This invention relates to holography and more particularly to a method and apparatus for checking the stability of a setup for recording reflection type (white light) holograms.

2. Description of the Prior Art

There are presently several known techniques for producing holograms as exemplarily described in Kurtz et al. U.S. Pat. No. 3,535,014. In the production of holograms, it is known that the position of optical interference fringes may be stabilized by providing a high degree of mechanical rigidity between the various elements affecting the phase of the interfering light beams. The Neumann U.S. Pat. No. 3,494,698 discloses a feedback control device for the stabilization of the interference fringes.

Michael, in Applied Optics, Vol. 9, No. 6, p. 1,481 (June, 1970) discloses a method for checking the stability and coherence of a holographic system in its final configuration, preferably immediately before construction of the hologram. However this method does not take into special account the influence of noise, vibrations, and thermal stress on a holographic plate.

Recording reflection type (white light) holograms requires a much higher degree of stability of the entire holographic system compared to ordinary transmission holograms because the interference pattern formed in the depth of the emulsion is essentially oriented parallel to the photographic plate. Because the photographic plate can behave as a membrane, any minor vibrations of the plate will therefore severely degrade or if the vibration amplitude is greater than one half of the wavelength of light, completely destroy the recording. Even if vibrations of the photographic plate can be controlled, long term stability of the entire system is required because low light levels are usually employed, if the object to be recorded is the reconstricted real image of a master hologram. Consequently the surface of the photographic plate will have thick emulsions with low sensitivity, in order to obtain better resolution and more brilliance in the recording. Even with a fifty mW He-Ne laser, exposure times up to 30 seconds or more are common.

SUMMARY OF THE DISCLOSURE

The disadvantages of the prior art are solved by the present invention which relates to a double interferometer method and apparatus to check the stability of a setup for recording white light holograms, wherein special emphasis is given to the stability of the plate. This is necessary even after the general setup has stabilized mechanically and thermally, because environmental noise (plate resonance) and thermal stresses on the plate inserted for exposure may degrade or destroy the recording. The invention provides two sets of interference fringes for simultaneous observation. One set provides information about coherence and stability of the setup alone, and the other demonstrates coherence and stability of the entire system, including the plate.

DETAILED DESCRIPTION OF THE DISCLOSURE

Figure 1:
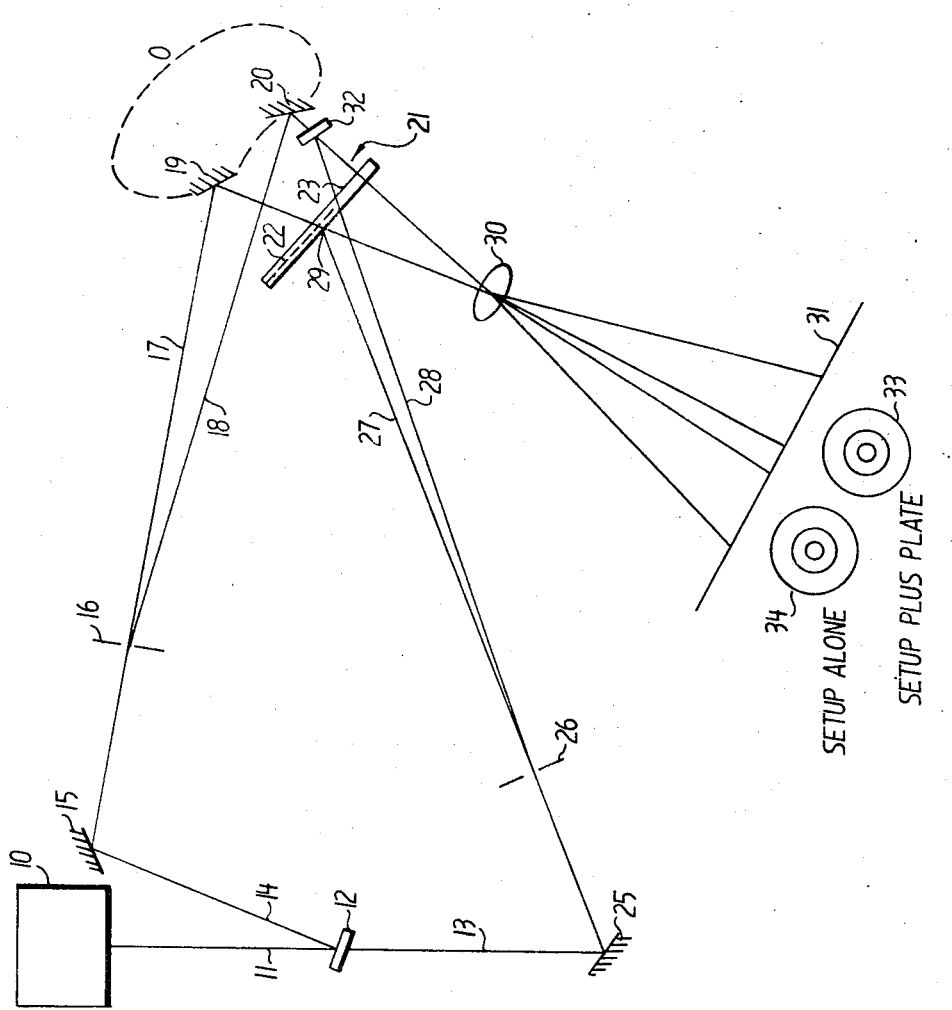
FIG. 1 shows the manner according to the invention for checking the stability of a setup for recording white light holograms.

FIG. 1 shows an apparatus to practice the method according to the invention, for checking the stability of a setup for recording reflection type (white light) holograms. A laser light source 10 directs beam 11 towards beam splitter 12, which functions to split beam 11 into beams 13 and 14. Beam 14 is directed in a path towards mirror 15, and is reflected thereby through spatial filter 16 which causes beams 17 and 18 to be directed to mirrors 19 and 20 respectively.

Mirrors 19 and 20 are rigidly mounted in front of the position assumed by object O during construction of the hologram, and reflect light beams 17 and 18 as described hereinafter.

Figure 2:
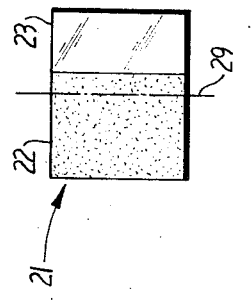
FIG. 2 is a front view of the plate used in FIG. 1 during the checking procedure.

Glass plate 21 comprises sections 22 and 23 as shown in FIGS. 1 and 2, and is utilized in the setup instead of a reflection type hologram normally employed during the recording procedure. Semi-transparent section 22 comprises two-thirds of plate 21 and is treated to be 50 percent transparent, whereas section 23 is clear. In order to maintain the original vibration and resonance conditions, the regular glass photographic plate used in recording the reflection type holograms may be stripped of the emulsion and two-thirds of it may be aluminized to form section 22 of 50 percent transparency.

Beam 13 is reflected by mirror 25 through spatial filter 26 to cause beams 27 and 28 to be directed to plate 21. The plate 21 is positioned such that the aluminized portion 22 of plate 21 which functions as a beam splitter, combines beam 17 reflected by mirror 19 with beam 27 in the center 29 of plate 21 where the maximum vibration amplitudes occur, and the clear portion 23 passes beam 28. Beams 17 and 27 interfere at the center 29 of plate 21, and the interference pattern 33 is projected through lens 30 onto screen 31. Circular fringes result on screen 31 when the images of the pinholes of spatial filters 16 and 26 are made to coincide in or close to the focal plane of lens 30.

Beam 28 passes through the clear portion 23 of plate 21, and recombines at beam splitter 32 with beam 18 from spatial filter 16, which is reflected by mirror 20 to beam splitter 32. The recombined beams 18 and 28 also interfere, and the interference pattern 34 is directed through the clear portion 23 of plate 21 and lens 30 onto screen 31.

Thus two sets of interference fringes can be observed simultaneously: one (34) giving information about coherence and stability of the setup alone, and the other (33) demonstrating coherence and stability of the entire system, including the holographic plate.

It is not necessary to use a plate 21 having a semi-transparent portion as described above to demonstrate the stability of the over-all system. Thus the reflection from an unexposed, developed, and fixed plate is sufficient to obtain the two sets of fringe patterns, although its use will provide a comparative degradation in fringe contrast.

The procedure described herein thus provides a stability test setup wherein the interference pattern of light beams utilized in the hologram system and recombined where maximum vibration amplitudes of the holographic plate occur, may be compared to the interference pattern of light beams of the hologram system recombined at a point not subject to holographic plate vibrations. This double interferometer approach shows that special concern should be given to the disturbances caused by environmental noise (plate resonance) and by thermal stress on the holographic plate inserted for exposure in the system. This is required even after the setup has stabilized mechanically and thermally.

What is claimed is:

1. A method for determining the stability of a setup to record a hologram of an object on a holographic plate comprising:
   forming first and second beams from a laser source,
   filtering the first and second beams through first and second spatial filters to form first and second filtered beams,
   intercepting one of the first and second filtered beams at the position occupied by the object during actual hologram recording, reflecting a part thereof from that position for interception by a test plate positioned where the holographic plate is normally positioned during actual hologram recording, and reflecting another part thereof for interception by a beam splitter,
   intercepting a part of the other of the first and second filtered beam at the test plate, and intercepting another part thereof at the beam splitter,
   recombining the parts of the first and second filtered beams intercepted by the beam splitter such that they interfere to derive a first set of interference fringes relating to coherence and stability of the setup alone,
   recombining the parts of the first and second filtered beams intercepted by the test plate such that they interfere to derive a second set of interference fringes relating to the coherence and stability of the entire system including the setup and holographic plate, and
   focusing the first and second sets of interference fringes onto a screen for observation.

2. The method of claim 1 further comprising:
   recombining the parts of the first and second filtered beams intercepted by the test plate at a first section of the test plate which is semitransparent to derive the second set of interference fringes, and
   directing the recombined parts of the first and second filtered beams intercepted by the beam splitter through a second section of the test plate which is clear before focusing the first set of interference fringes onto the screen.

3. The method of claim 2 further comprising:
   recombining the parts of the first and second filtered beams intercepted by the test plate at a position in the test plate corresponding to the position in the holographic plate used during actual hologram recording at which maximum vibration amplitudes occur.

4. The method of claim 2 further comprising:
   utilizing a test plate made by stripping the emulsion from the holographic plate used during actual recording, and treating it to form a first section which is semi-transparent, and a second section which is clear.

5. The method of claim 1 further comprising:
   utilizing as the test plate a holographic plate which is unexposed and developed.

6. An apparatus for determining the stability of a setup to record a hologram of an object on a holographic plate comprising:
   a laser source,
   means to form first and second beams from the laser source,
   first and second spatial filters,
   means to direct the first and second beams through the first and second spatial filters to form first and second filtered beams,
   a test plate positioned where the holographic plate is normally positioned during actual hologram recording,
   means to intercept one of the first and second filtered beams at the position occupied by the object during actual hologram recording thereof, reflect a part of it from that position to the test plate, and reflect another part of it to a beam splitter, the test plate and beam splitter being positioned to intercept different parts of the other of the first and second filtered beams, the beam splitter being operative to recombine the parts of the first and second filtered beams intercepted thereby such that they interfere and form a first set of interference fringes relating to coherence and stability of the setup alone, the test plate being operative to recombine the parts of the first and second filtered beams intercepted thereby to form a second set of interference fringes relating to the coherence and stability of the entire system including the setup and holographic plate,
   a screen, and
   focusing means to foxus the first and second sets of interference fringes onto the screen for observation.

7. An apparatus as recited in claim 6 wherein the test plate comprises a first section which is semi-transparent to form the second set of interference fringes, and a second section which is clear positioned in the path of the parts of the first and second filtered beams recombined by the beam splitter, between the beam splitter and the focusing means.

8. An apparatus as recited in claim 7 wherein the parts of the first and second filtered beams recombined by the test plate are recombined at a position corresponding to the position in a holographic plate used during actual hologram recording at which maximum vibration amplitudes occur.

9. An apparatus as recited in claim 7 wherein the test plate comprises a holographic plate used during actual hologram recording with its emulsion removed, and which is treated to form the first section of the test plate that is semi-transparent.

10. An apparatus as recited in claim 6 wherein the test plate comprises a holographic plate which is unexposed and developed.

* * * * *